United States Patent [19]

Plachy

[11] 4,415,513
[45] Nov. 15, 1983

[54] METHOD OF MANUFACTURING A COMPOSITE FOAM TAPE TRANSPORT CAPSTAN

[75] Inventor: Ivo T. Plachy, San Mateo, Calif.

[73] Assignee: Telex Computer Products, Inc., Tulsa, Okla.

[21] Appl. No.: 225,262

[22] Filed: Jan. 15, 1981

Related U.S. Application Data

[62] Division of Ser. No. 44,100, May 31, 1979, Pat. No. 4,280,646.

[51] Int. Cl.³ .......................................... B29D 27/00
[52] U.S. Cl. ................................. 264/45.4; 249/83; 249/160; 264/46.5; 264/46.9; 264/267; 264/274; 425/4 R; 425/812
[58] Field of Search ............... 264/45.4, 46.9, 46.5, 264/53, 267, 274; 249/83, 160; 425/4 R, 812

[56] References Cited

U.S. PATENT DOCUMENTS

| | | | |
|---|---|---|---|
| 2,715,024 | 8/1955 | Nydegger et al. | 226/191 |
| 2,829,400 | 4/1958 | Morin | 264/46.9 |
| 2,979,779 | 4/1961 | Staak | 264/46.9 X |
| 2,981,984 | 5/1961 | Orr | 264/45.4 |
| 3,161,912 | 12/1964 | Wiles et al. | 264/53 X |
| 3,174,670 | 3/1965 | Zernov | 226/117 |
| 3,233,016 | 2/1966 | Kracht | 264/53 |
| 3,267,484 | 8/1966 | Roedder | 264/46.9 X |
| 3,559,861 | 2/1971 | Knox | 226/168 |
| 3,978,181 | 8/1976 | Vahle | 264/46.9 X |
| 4,065,044 | 12/1977 | Painter et al. | 226/188 |
| 4,186,162 | 1/1980 | Daley | 264/46.9 X |
| 4,295,810 | 10/1981 | Dennert et al. | 264/45.4 X |

OTHER PUBLICATIONS

Wood, R. N. "Roamed Air Bearing Cylinder", IBM Technical Disclosure Bulletin, vol. 3, No. 10, Mar. 1961, p. 22.
Whittington, Lloyd R. "Whittington's Dictionary of Plastics", Stamford, Conn., Technomic, ©1968, Preface; pp. 59-60.

Primary Examiner—Philip E. Anderson
Attorney, Agent, or Firm—Head, Johnson & Stevenson

[57] ABSTRACT

A capstan for use on a tape transport, including a hub, a tubular outer rim supported co-axially about the hub, and a body portion of foam plastic between the hub and rim.

2 Claims, 6 Drawing Figures

METHOD OF MANUFACTURING A COMPOSITE FOAM TAPE TRANSPORT CAPSTAN

This is a divisional application of Ser. No. 44,100, filed May 31, 1979 now U.S. Pat. No. 4,280,646 issued July 28, 1981.

BACKGROUND OF THE INVENTION

1. Field of the Invention

This invention relates to a method of manufacturing a capstan for use in a magnetic tape transport system and more particularly to a capstan which has low mass, a low moment of inertia-to-diameter ratio, and which is inexpensive to manufacture compared to other capstans having similar characteristics.

2. Description of the Prior Art

In the computer industry it is important to accelerate magnetic tape from a stop position to a preselected rate, such as 200 inches per second, in a very short time. In like manner, when the tape is running, it is desired to stop the tape in an exceedingly short period of time. In some instances the tape must be started in one direction and very quickly thereafter stopped and reversed and moved in the opposite direction. For a given tape speed and start and stop distances, a power required to accelerate the capstan is proportional to the square of the mass moment of inertia. It can be seen that providing a capstan of very low mass and very low moment of inertia-to-diameter is exceedingly important. Others have provided capstans having these desired characteristics. Reference may be had to U.S. Pat. No. 4,965,044 entitled "CAPSTAN", issued Dec. 27, 1977. This patent provides a type of capstan wherein the goal is the same as in the present invention, that is, a capstan for driving a magnetic tape wherein the capstan has a low mass and a low moment of intertia-to-diameter ratio. References cited in this patent may also be resorted to as background information for the type of product to which the present invention is directed.

Briefly stated, an object of the present invention is to provide a method of manufacturing a capstan for use in magnetic tape transport systems in which the capstan has a low mass and a low inertia-to-diameter ratio and particularly wherein such goals are achieved in a new way facilitating the construction of the capstan much more expeditiously and economically than prior known construction methods.

SUMMARY OF THE INVENTION

A capstan for use in a tape transport system is manufactured, the capstan being adapted for mounting on a rotatable shaft in the transport system, the capstan including a hub to be received on and rotated by the shaft, a tubular outer rim supported coaxially about the hub, and a body portion of foam plastic between the hub and the rim.

The invention is also directed towards a method of manufacturing a capstan comprising positioning a tubular outer rim in a cylindrical cavity mold, the internal diameter of the mold being equal to the external diameter of the rim, the mold having opposed end surfaces perpendicular to the cavity axis and having a cylindrical shaft extending from the end surface axially of the mold cavity, inserting a hub having an axial opening therein onto the shaft within the mold cavity whereby the hub is supported coaxially of the tubular outer rim, filling the mold cavity with expandable polystyrene particles, closing the mold cavity with an end cap providing a second end surface parallel to and spaced from the mold end surface, and heating the expandable polystyrene particles within the mold cavity to expand and coalesce the particles to bind the hub and rim into a unitary device.

DETAILED DESCRIPTION

Figure 1:
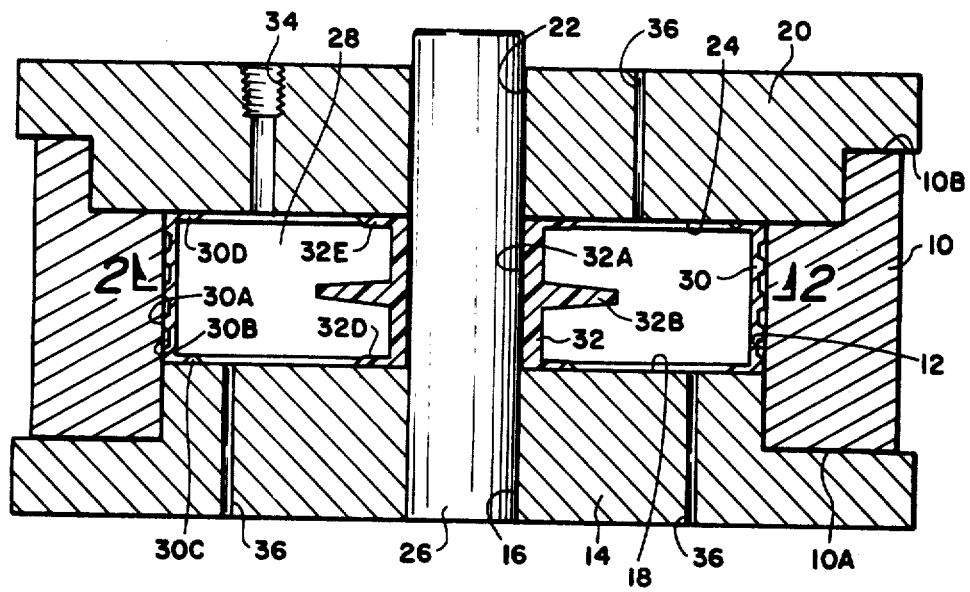
FIG. 1 is a cross-sectional view of a mold used in manufacturing the styrofoam capstan of this invention showing elements of the capstan within the mold.

Referring first to FIG. 1, the method of manufacturing a capstan according to the invention will be described. The method employs a mold having four basic pieces, that is, a cylindrical body 10 having a cylindrical cavity 12 therein. Affixed to one end 10A of the mold body is an end panel 14 having an axial opening 16 therein. The end panel has a surface 18 perpendicular the axis of opening 16, the surface 18 forming a boundary of the mold cavity. Affixed to the other end of the mold body 10 in engagement with the opposite end surface 10B is an end cap 20 having an axial opening 22 therein. The end cap 20 has a planar surface 24 perpendicular the axial opening 22 and is supported so as to be parallel to the surface 18 of the end panel 14. End cap 20 is removable from the body 10 such as by means of bolts (not shown) or removable clamps may be employed (also not shown). Received in openings 16 and 22 is a cylindrical shaft 26.

These four elements, that is, body 10, end panel 14, end cap 20, and shaft 24 form the basic parts of the mold for use in manufacturing the capstan which will be subsequently described. These four parts define an area or cavity 28 which establishes the dimensions of the capstan to be formed.

Positioned within cavity 28 is a tubular outer rim 30 formed of metal or high density plastic. Rim 30 is a tubular element having an outer surface 30A which defines the tape engaging surface of the completed capstan. The outer surface 30A may be provided, as illustrated with a plurality of circumferential grooves 30B to increase the effectiveness of contact of the surface with the tape during high-speed operation. The grooves 30B provide improved means for escape of air trapped between the tape and the peripheral surface of the capstan during rapid movement of the tape. The use of grooves 30B is a known expediency in capstan design.

The outer rim 30 may also include, as illustrated, integral reduced diameter circumferential flanges 30C and 30D. The flanges are on opposed ends of the rim.

Figure 2:
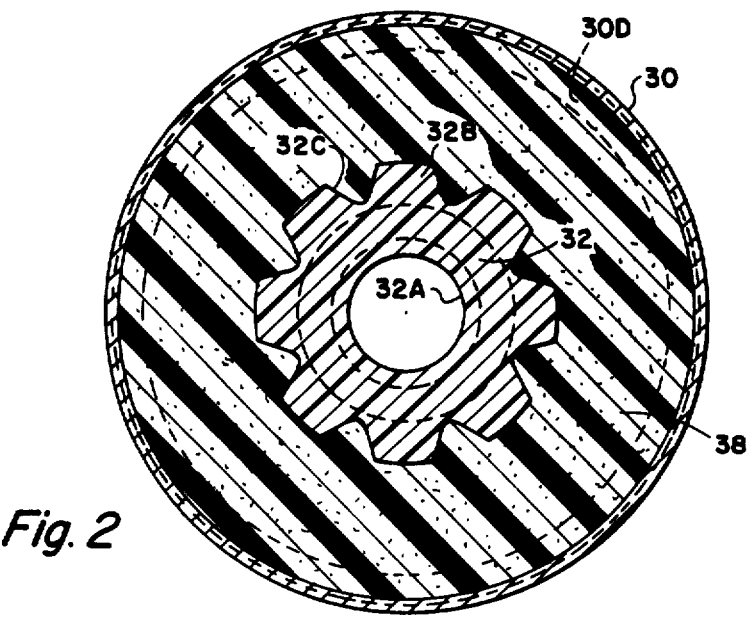
FIG. 2 is a cross-sectional view of the capstan taken along the line 2—2 of FIG. 1 and showing the capstan after removal of the mold.

Positioned on shaft 18 is a capstan hub 32 formed of high density plastic or metal. Hub 32 has an axial opening 32A and is the opening which receives the drive shaft of a tape transport system when the capstan is in use. The hub 32 must transmit torque from itself to the outer rim 30. An integral enlarged diameter portion 32B has a non-circular cylindrical peripheral surface as illustrated in FIG. 2 formed by notches 32C. Any configuration of the hub providing an exterior peripheral surface for increased torque transmitting characteristics would be within the scope of the invention.

Hub 32 may also include, as illustrated, enlarged diameter flanges 32D and 32F integrally formed with the hub.

In one method, the capstan is completed by injecting into cavity 28 through an injection opening 34 formed in cap 20, foam plastic material. The injected material solidifies, completely filling the cavity, and forms the base material of the capstan to not only permanently support the outer rim 30 concentrically about the hub 32 but forms the means of transmitting torque from the hub to the rim.

In another means of constructing the capstan, the cavity 28 is filled with expandable polystyrene pellets. After filling, the cavity end cap 20 is secured in position, and the pellets are treated to form a solid mass of expanded polystyrene such as by the injection of steam through injection opening 34. Gas trapped in the expandable polystyrene pellets expands the pellets and the pellets are coalesced into a homogenous foamed solid mass due to the heat from the steam. Vent holes 36 are also preferably provided in end panel 14 and end cap 20 to allow gas to escape and to insure that the entire cavity 28 is completely filled with foam plastic after the treatment process.

Figure 3:
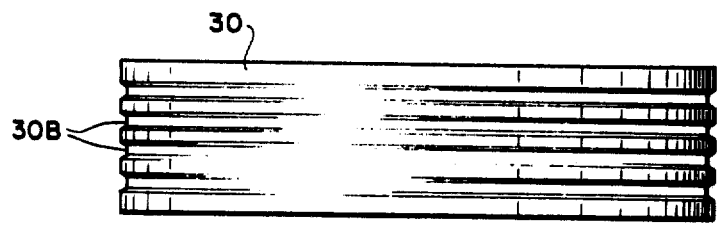
FIG. 3 is an elevational view of a completed capstan showing the external configuration of the outer rim and showing the circumferential surface which contacts tape to drive the tape as the capstan is utilized in a tape transport device.

As soon as the foam plastic has solidified, end cap 20 is removed and the completed capstan removed from the mold. The capstan then appears as in FIG. 6 while FIG. 3 shows the preferred configuration of the outer rim 30 and the grooves 30B in the peripheral surface.

Figure 5:
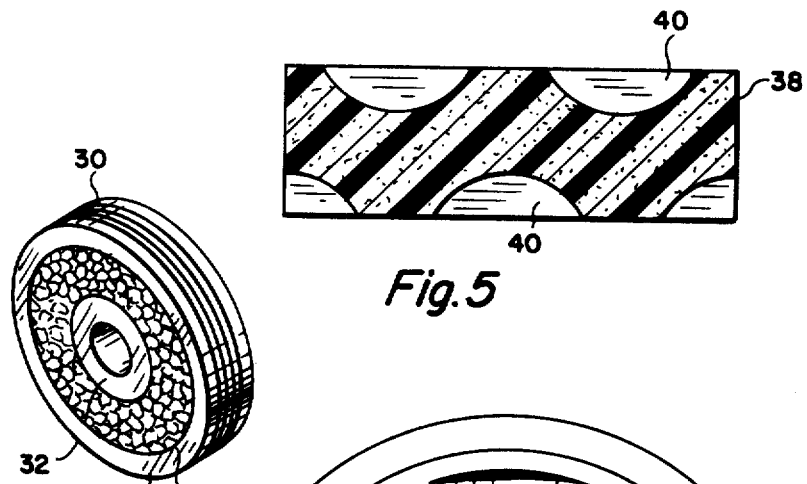
FIG. 5 is a cross-sectional view taken along the arcuate line 5—5 of FIG. 4 showing how recesses may be formed in a capstan manufactured according to the principles of this invention so as to further reduce the mass.
Figure 4:
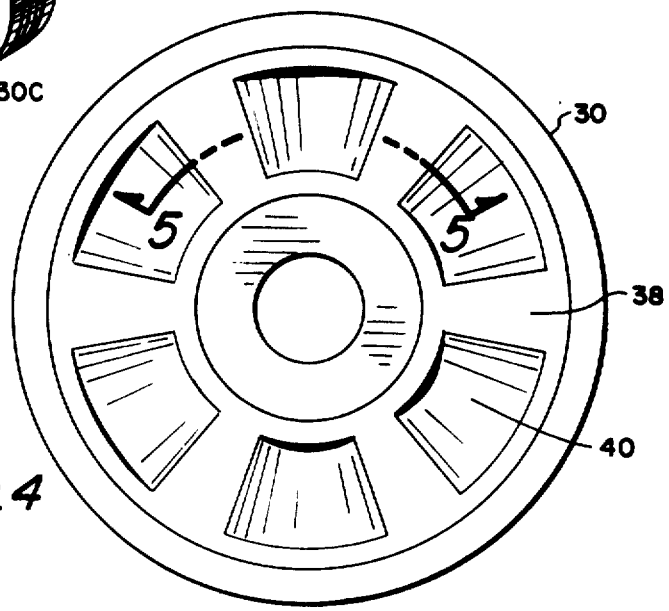
FIG. 4 is an end view of a completed capstan showing an alternate embodiment wherein recesses are molded in the side walls of the capstan to further reduce the mass thereof.

The end walls of the completed capstan are planar conforming to the planar surface 18 of end panel 14 and planar surface 24 of end cap 20. FIGS. 4 and 5 show an alternate arrangement wherein the mass of the capstan may be further reduced. In this arrangement the surface 18 of end panel 14 and surface 24 of end cap 20 are provided with spaced protrusions (not shown) which reduce the volume of cavity 28. In such an arrangement the finished capstan will appear as shown in FIG. 4 wherein recesses 38 are formed in the capstan side walls. The specific configuration of the recesses is optional; and in the preferred arrangement, as illustrated in FIG. 5, the recesses are arranged so as to be in opposite orientation from each of the end walls for increased structural rigidity.

Figure 6:
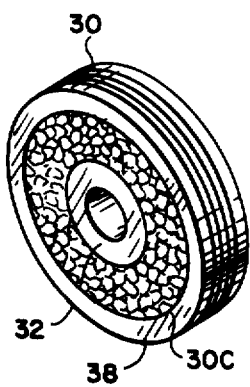
FIG. 6 is an isometric view of a capstan according to the invention having planar ends.

The plastic foam, or coalesced expanded polystyrene particles, filling the mold 28 forms the capstan body 38 as shown in FIGS. 2 and 6. Thus the completed capstan includes the three basic elements of a hub 32, the capstan body 38, and the outer rim 30. These elements are secured to each other by the adhesive effect of foam plastic or coalesced expanded polystyrene particles so that the completed capstan is a unitary device of exceedingly lightweight, yet is sufficiently strong to impart the required acceleration to magnetic tape in a tape transport system.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element or step thereof is entitled.

What is claimed is:

1. A method of manufacturing a tape transport capstan comprising:

positioning a tubular outer rim in a cylindrical cavity mold, the internal diameter of the mold being equal the exterior diameter of the rim, the mold having an end surface perpendicular the cavity axis and having a cylindrical shaft extending from the end surface axially of the mold cavity;

inserting a hub having an axial opening therein onto said shaft and within the mold cavity, the hub having an internal radially extending non-circular portion, such portion being spaced intermediate the hub ends and extending towards said tubular outer rim;

closing the mold cavity with an end cap providing a second end surface parallel to and spaced from the mold cavity end surface;

filling the mold cavity having the rim and hub therein with foam plastic material;

allowing the foam plastic material within the mold to solidify; and removing the contents of the mold in which the hub, rim, and solidified foam plastic are bound into a unitary device.

2. A method of manufacturing a tape transport capstan comprising:

positioning a tubular outer rim in a cylindrical cavity mold, the internal diameter of the mold being equal the exterior diameter of the rim, the mold having an end surface perpendicular the cavity axis and having a cylindrical shaft extending from the end surface axially of the mold cavity;

inserting a hub having an axial opening therein onto said shaft and within the mold cavity, the hub having an internal radially extending non-circular portion, such portion being spaced intermediate the hub ends and extending towards said tubular outer rim;

filling the mold cavity having the rim and hub therein with expandable polystyrene particles;

closing the mold cavity with an end cap providing a second end surface parallel to and spaced from the mold cavity end surface;

introducing a heating fluid into the mold cavity to expand and coalesce the polystyrene particles;

cooling the contents of the mold; and removing the contents of the mold in which the hub, rim and coalesced polystyrene particles are bound into a unitary device.

* * * * *